US012084907B2

(12) United States Patent
Roegge

(10) Patent No.: US 12,084,907 B2
(45) **Date of Patent: *Sep. 10, 2024**

(54) FRAMING BRACKET AND METHOD OF CLADDING BUILDING WALLS

(71) Applicant: Stephen M. Roegge, Alpharetta, GA (US)

(72) Inventor: Stephen M. Roegge, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,156

(22) Filed: Apr. 12, 2023

(65) Prior Publication Data

US 2023/0243204 A1 Aug. 3, 2023

Related U.S. Application Data

(63) Continuation of application No. 17/233,432, filed on Apr. 16, 2021, now Pat. No. 11,655,663, which is a continuation of application No. 16/879,593, filed on May 20, 2020, now Pat. No. 10,982,483, which is a continuation of application No. 16/120,683, filed on Sep. 4, 2018, now Pat. No. 10,662,698.

(60) Provisional application No. 62/554,119, filed on Sep. 5, 2017.

(51) Int. Cl.
*E06B 1/02* (2006.01)
*E06B 1/36* (2006.01)

(52) U.S. Cl.
CPC . *E06B 1/02* (2013.01); *E06B 1/36* (2013.01)

(58) Field of Classification Search
CPC . E06B 1/02; E06B 1/36; E06B 1/6015; E06B 1/6069; E06B 1/12
See application file for complete search history.

(56) References Cited

U.S. PATENT DOCUMENTS

| | | | |
|---|---|---|---|
| 4,021,987 | A | 5/1977 | Schnebel |
| 5,842,315 | A | 12/1998 | Lin |
| 6,161,344 | A | 12/2000 | Blanchett |
| 6,470,629 | B1 | 10/2002 | Haddock |
| 6,526,709 | B1 | 3/2003 | Jacobsen |
| 6,817,147 | B1 | 11/2004 | McDonald |
| 7,165,364 | B2 | 1/2007 | Inelli |
| 7,752,818 | B1 | 7/2010 | Roegge |
| 8,769,898 | B2 | 7/2014 | Carolan et al. |
| 9,238,937 | B2 | 1/2016 | Costa |
| 9,388,567 | B2 | 7/2016 | Watanabe |

(Continued)

FOREIGN PATENT DOCUMENTS

| | | |
|---|---|---|
| CA | 2426434 | 10/2004 |
| FR | 2231838 | 12/1974 |
| GB | 2290573 | 1/1996 |

*Primary Examiner* — Adriana Figueroa
(74) *Attorney, Agent, or Firm* — HSML P. C.

(57) ABSTRACT

A system, device and method of framing an opening, such as a window, in a clad façade 12 structure to align the window units 22 to be positioned adjustably so that the exterior sight lines align the windows without custom fabrication of the clad façade. This allows irregular variations in the original building structure to be eliminated by a perfectly aligned façade. A frame 20 has wide flanges 40 to allow the defined inner box frame area 34 to be positioned and then the frame can be shimmed to that position. Sections of frame 20 are joined by an angled member 54 with flat portion which are received in slots 56 in frame sections at their edges.

3 Claims, 9 Drawing Sheets

(56) References Cited

U.S. PATENT DOCUMENTS

| | | | |
|---|---|---|---|
| 9,470,036 B2 | 10/2016 | Hodgson et al. | |
| 9,644,380 B1 * | 5/2017 | Pigott, Jr. | E06B 3/44 |
| 10,557,302 B1 * | 2/2020 | Pigott, Jr. | E06B 1/345 |
| 2004/0159059 A1 | 8/2004 | Blundo | |
| 2005/0178079 A1 * | 8/2005 | Hardman | E06B 1/64<br>52/204.5 |
| 2009/0193729 A1 | 8/2009 | Kustermann | |

* cited by examiner

FRAMING BRACKET AND METHOD OF CLADDING BUILDING WALLS

CROSS REFERENCE TO RELATED APPLICATIONS

This is a continuation application of U.S. application Ser. No. 17/233,432 filed on Apr. 16, 2021, which is a continuation application of U.S. application Ser. No. 16/879,593 filed on May 20, 2020, which is a continuation application of U.S. application Ser. No. 16/120,683 filed on Sep. 4, 2018, which claims benefit of provisional application No. 62/554,119 filed on Sep. 5, 2017, the entire disclosures of which are hereby incorporated by reference herein.

BACKGROUND OF THE DISCLOSURE

Field of the Disclosure

The present disclosure is directed to framing system and bracket as well as a method for building cladding walls using a framing bracket.

Description of the Related Art

The use of aluminum clad panels for exterior, building facings has been known in the prior art for some period of time. The advantage of such cladding is that it is a highly efficient way to give a building a new look without the cost of tearing down exterior of the building.

The problem with this type of façade replacement is that the existing building will have openings (windows/doors etc.) which are irregularly located on the existing buildings. Furthermore, most of the lines of the building will not be square, level or straight, either because the initial construction was not accurate, or settling over the years.

Since cladding is a modular construction technique, is it potentially capable of rapid construction. The rapid construction is often delayed because of the position of the original building openings (primarily windows) which are often misaligned. The misalignment can be tolerated in a building façade such as brick and mortar, but misalignment of clad walls with straight line seams, show misaligned openings as errors in placement. In such case, cladding must be customized for every opening as the cladding is installed. A solution to accommodate the irregularities in the existing building window alignment is needed. Such a solution should allow the cladding to be prefabricated and for the window position variances to be accommodated on site. Then customization of window openings is not required and the time to completion can be vastly reduced, perhaps up to 50%.

My own invention U.S. Pat. No. 7,752,818 issued on 13 Jul. 2010 provides some background and is incorporated by reference herein.

Aluminum Composite Cladding Systems are generally comprised of Aluminum Composite Material (ACM) panels, where panel flatness and a high performance finish are essential. Made from two sheets of aluminum bonded to a thermoplastic core, ACM is strong yet lightweight and with the right product knowledge and equipment, can be fabricated into components and systems that outperform other cladding materials in most situations.

The following prior art discloses the various aspects in the design and use of the joined interlocking aluminum sections.

U.S. Pat. No. 4,021,987, granted on May 10, 1977, to Fritz Schnebel et. al., discloses the use of tie beams and girders for use in retaining facades constructed from prefabricated elements. A facade is mounted thereon simply by attaching a retaining strip and interposing packing elements, whereupon the tie beams and girders of aluminum are capable of absorbing horizontal or vertical displacements of the facade within a specific tolerance range.

U.S. Pat. No. 5,842,315, granted on Dec. 1, 1998, to Gary Lin, discloses an insulated structural panel with a flat insulating core, first and second outer facings attached to opposed lateral surfaces of the insulating core, with a liner, elongated metal strip disposed between and attached to the insulating core and the first outer facing to the extended length of the panel for increasing the bending strength of the panel.

U.S. Pat. No. 6,470,629 granted on Oct. 29, 2002, to R. M. Haddock, discloses an apparatus for securing members to a surface. The apparatus includes a mounting clamp, a mounting adaptor, a panel support member and a fastener. The panel support member and the mounting adaptor are slideably interconnected to one another. The mounting adaptor is fixedly interconnected to the mounting clamps using the fastener. The mounting adaptor may also include an area of reduced strength to permit the controlled failure of the apparatus in response to excess loading. The panel support member may be adapted to receive a panel. When installed on a surface, the apparatus obscures the view of mounting devices or equipment that may also be secured to the surface.

U.S. Pat. No. 6,817,147, granted on Nov. 16, 2004, to Douglas B. MacDonald, discloses a clip for panel trim that is a U-shaped flexible member defining a base and extending arms with end portions extending inwardly for insertion in openings of a partition frame member to retain the clip on the frame so that the base is separated from the frame for routing of utility lines on the partition frame member and through the clip.

These prior art devices including my own, do not address the problem of efficient construction despite building irregularities, but rather, deal with attachment of modular panels to framing.

A method of installation is also disclosed.

The present disclosure in it various embodiments overcomes these problems.

BRIEF SUMMARY

The disclosure encompasses many embodiments. One such embodiment is detailed below in summary fashion. Please understand that this summary does not encompass the entire disclosure but is provided to assist the reader in reviewing the entire disclosure and claims which also constitute part of the disclosure.

There is disclosed a frame for adapting building openings to a fixed size and position on a cladding wall, comprising any or all of the following elements:

a. right, left, upper and lower boundary frame elements having inner and outer facing surfaces, oriented generally orthogonally to the cladding wall, each element having a top, bottom and side edges, said side edged being joinable to form an inner box wall of inner facing surfaces;

b. offset from said top edge of each frame element a predetermined distance, is a flange member extending generally orthogonally from said outer facing surface; thereby defining a box frame;

said outer faces further including a channel extending at least partway from said edges;

a L-shaped joiner element having a pair of planar elements, said planar element sized to be received within said channels, so that when joined, said box frame is formed and maintained by the connection of boundary frame elements together by the joiner element in the channels.

There is also disclosed the boundary frame elements having a first planar part, defining a first plane, and a second planar part joined to said first planar part in a second plane offset from said first plane and parallel thereto.

There is also disclosed the attachment of said flange members to said first planar part.

There is also disclosed a method of framing a building opening, such as a door or window for a façade cladding wall system designed to cover an original building wall having building openings; comprising any or all of the steps below, in any order:

a. constructing a frame larger than the size of each building opening on façade cladding wall, the frame having a plurality of panels having planar surfaces and top, bottom and side edges wherein the side edges are joined to form a box frame defining an inner box larger that openings on the original building wall; the frame constructed to further include a plurality of flanges extending orthogonal from the planar surfaces and extending outwardly way from the inner box;
b. constructing the cladding wall with openings generally corresponding to the building openings adjacent but larger than the actual building openings;
c. loosely installing the frame over the original building elements;
d. installing the cladding wall over the original building wall with the cladding openings receiving a portion of the frame;
e. adjusting the position of the frame center on the original building opening;
f. permanently affixing the frame to the cladding wall system; thereby creating a frame centered around the original building opening and wherein a continuous joint is created between the cladding wall and the frame by virtue of the flanges extending therebetween.

Also disclosed is a frame for adapting building openings to a fixed size and position on a cladding wall, having any or all of the following elements:

a. right, left, upper and lower boundary frame elements having inner and outer facing surfaces, oriented generally orthogonally to the cladding wall, each element having a top, bottom and side edges, said side edged being joinable to form an inner box wall of inner facing surfaces;
b. offset from said top edge of each frame element a predetermined distance, a flange member extending generally orthogonally from said outer facing surface; thereby defining an box frame;

said outer faces further including a channel extending at least partway from said edges;

an L-shaped joiner element having a pair of planar elements, said planar element sized to be received within said channels, so that when joined, said box frame is formed and maintained by the connection of boundary frame elements together by the joiner element in the channels.

Also disclosed is a frame for positioning building openings intended to receive a window on a building wall, to a desired position on the wall position, comprising a frame of any or all of the following elements:

a. right, left, upper and lower boundary frame elements having inner and outer facing surfaces, oriented generally orthogonally to the intended opening, each element having a top, bottom and side edges, said side edged being joinable to form an inner box wall of inner facing surfaces;
b. a flange member extending generally orthogonally from said outer facing surface; thereby defining an box frame, said flange member configured to extend from said opening to said frame, thereby making the frame positionable within said opening;

said outer faces further including a pair of opposing channels extending at least partway from said edges;

an L-shaped joiner element having a pair of planar elements orthogonal to each other, said planar element sized to be slideably received within said channels, so that when joined, said box frame is formed and maintained by the connection of boundary frame elements together by the joiner element in the channels.

Also disclosed is a method of adjustably framing a building opening, such as for a door or window in a cladding wall designed to cover an original building wall, the original building wall having at least one opening; comprising any or all of the following elements in any order:

a. on cladding wall, constructing a cladding wall opening frame having an opening equal to or larger than the size of the building wall opening;
b. constructing a box frame having a plurality of panels having planar surfaces and top, bottom and side edges wherein the side edges are joined to form a box defining an inner box equal to or larger than opening on the original building wall; the frame constructed to further include a plurality of flanges extending orthogonal from the planar surfaces and extending outwardly away from the inner box;
c. loosely installing the frame over the original building elements;
d. installing the cladding wall over the original building wall with the cladding openings receiving a portion of the frame;
e. adjusting the position of the frame center on the original building opening;
f. permanently affixing the box frame to the cladding wall system; thereby creating an opening for a window or door which is aligned according to the cladding wall by virtue of the flanges.

Many other features and combinations are disclosed and claimed.

DETAILED DESCRIPTION

This disclosure relates primarily to devices and method for framing in window/door openings in a clad façade to be applied over an original building façade, however, the devices and techniques can be used for other purposes related to the building trades beyond clad façade. To understand clad façade, reference should be had to my U.S. Pat. No. 7,752,818 which relates to devices and methods for attachment of such facades.

The problem of putting a façade over an original building face is that to reduce costs, the façade should be prefabricated with the least amount of custom fitting on site. That is, the best outcome is that measurements can be taken, but final adjustments can be made without customization. Window and doors (and other openings) in buildings are rarely square and even good measurement can be off enough that final adjustment of the openings in the clad cover would need to be customized. Furthermore, window placement in the clad cover need to be accurately aligned with each other, no matter the errors in the original façade or the clad façade will not look neat and clean. Imagine an old building with windows which are several centimeters out of alignment. Normally that is hardly noticeable in a standard façade, but in a clad façade where lines are very straight vertically and horizontally such errors are very noticeable. The eye tends to follow straight lines.

To solve these problems, the present disclosure describes a framing system and method which allows the opening in the clad over façade to have fixed openings relatively close to where the original façade's openings are, but then the frame which has wide flanges allows for the exact alignment of the openings to be made on site and without customization of the new façade wall. This greatly speeds installation and lowers costs.

Figure 1:
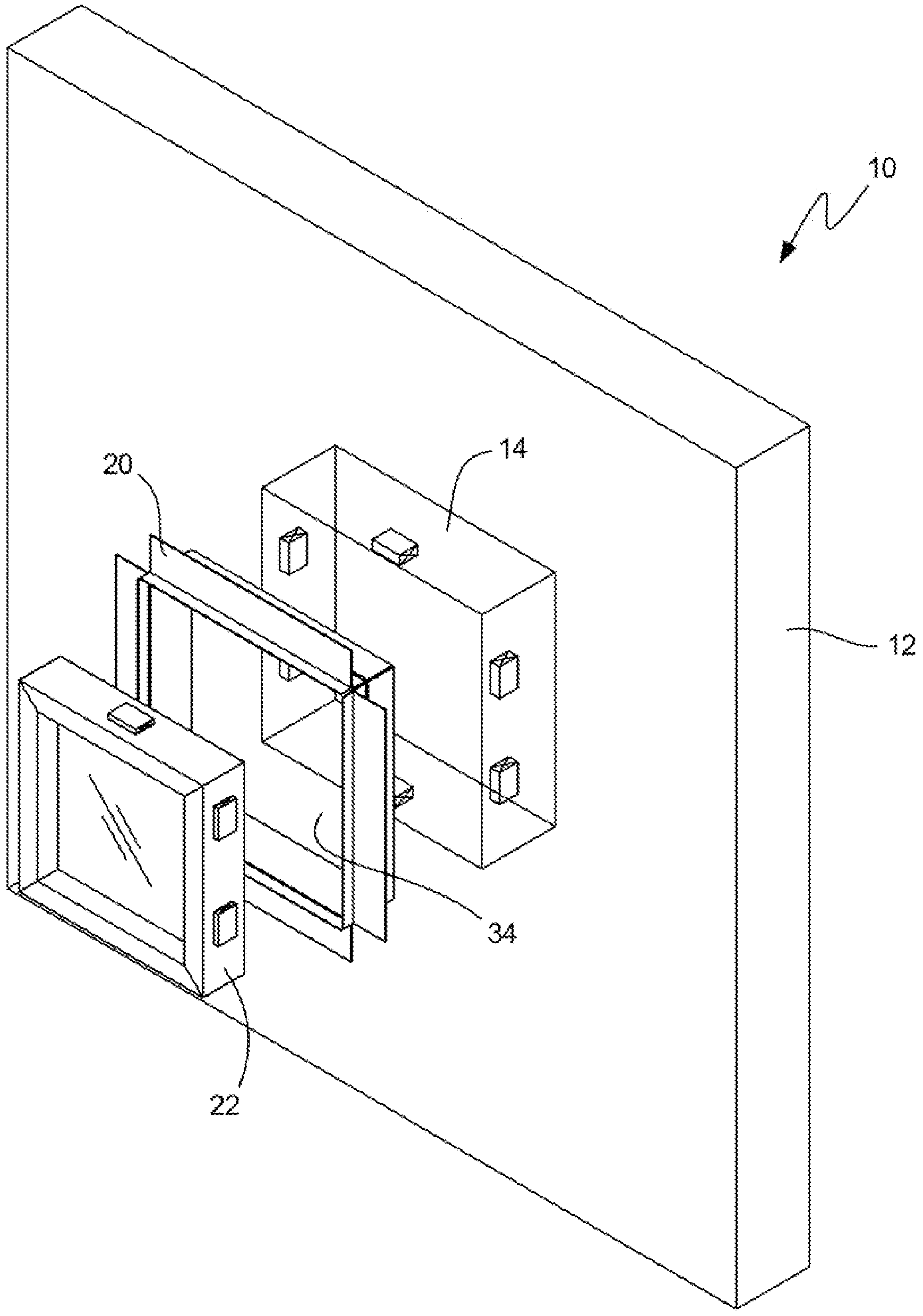
FIG. 1 is a perspective schematic view of a box frame in a cladding wall with a window opening.

FIG. 1 schematically illustrates a window system 10, with a portion of the façade wall 12, shown as a clad section, which has a precut opening 14. The opening receives the frame 20 which will be explained in greater detail, and a window unit 22 which is inserted into the frame at final installation.

Figure 2A:
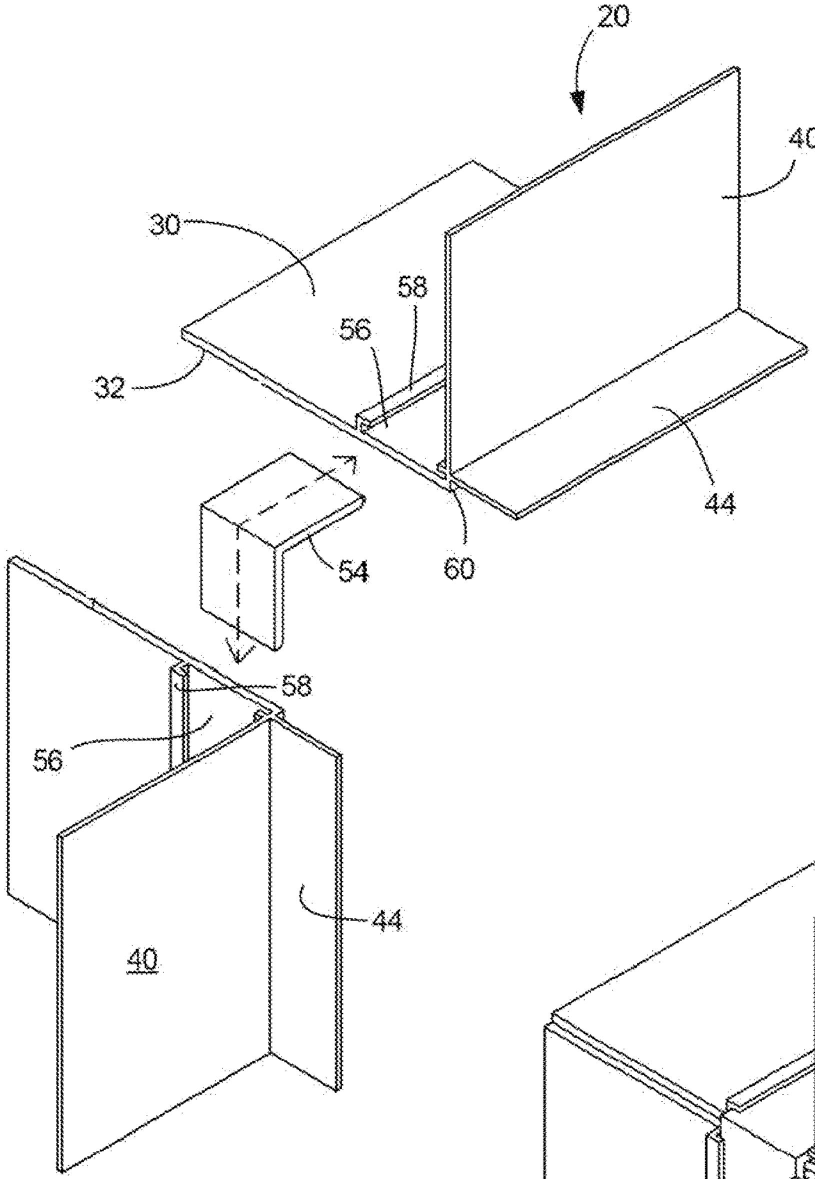
FIGS. 2A and 2B are perspective views of half of a frame (the other half not shown but symmetrical thereto) in exploded and connected orientations.
Figure 2B:
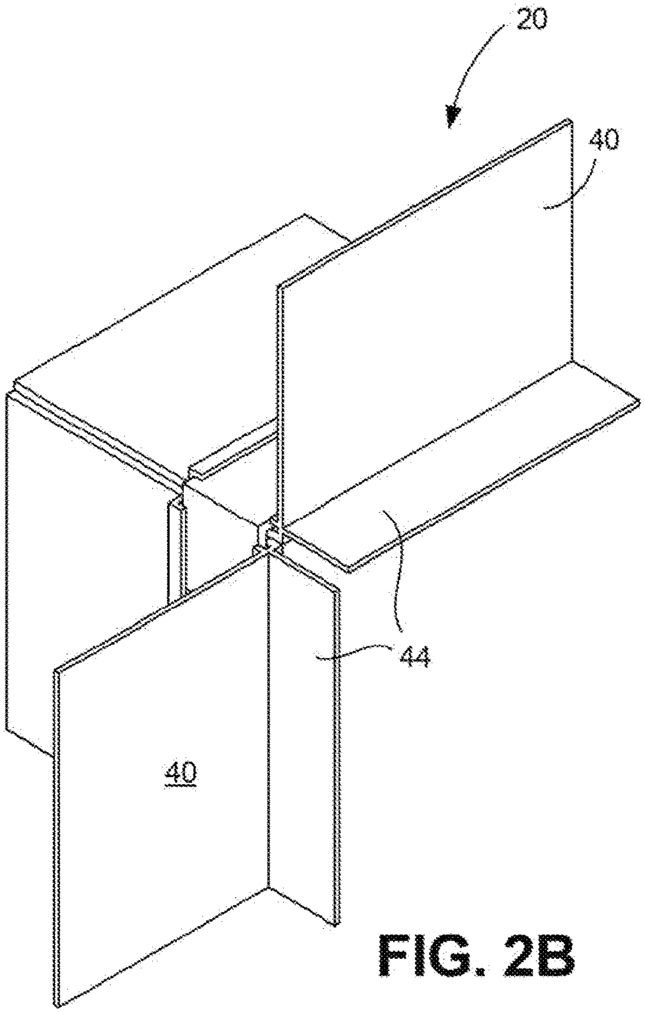

FIGS. 2A and 2B show half a frame section connected (2B) and exploded (2A). In this embodiment, the building wall has its own framing 31, or a new frame has been installed. The framing 31 is configured to mate with the flanges 30 of the outer frame virtue of recesses or flanges 33 in the inner or outer frame.

The other half is symmetric/mirror image of the shown half. See FIG. 1.

The frame is constructed of a building material such as aluminum. Here there are 4 sections (more are possible for complex openings). Each section 30 has a planar portion 32 which will end up being oriented generally orthogonally to the façade. The four sections 30 will be joined together to form an inner box area 34. Between top and bottom edges of the section, a wide flange 40 extends orthogonally from section 30 away from the inner box. It is this flange which allows for adjustment of the position of the frame in the larger opening provided in the clad façade. The term "wide" is intended to mean wide enough to allow adjustment side to side or top to bottom and still provide a flange to façade overlap, for weatherproofing purposes. In practice 100 mm (50-250 mm) would work for many window openings. A second flange 44 extends orthogonally to wide flange 40 in a direction away from the building and provides an abutment surface for a window unit 22.

Flanges 44 may be coplanar with planar portion 32 or it may be offset 60 in parallel planes as shown.

The edges of frame portions 20 may have mitered edges to allow a close fit when joined. They may be joined by spot welding, adhesive or other means. The structure shown is a right angle joint element 54 which planar and has a thickness sized to be received in channel 56 formed of spaced apart guides 58. This allows for easy on site assembly of smaller parts and some degree of slideably adjustability if the inner box size 34 is an issue during installation.

Figure 3B:
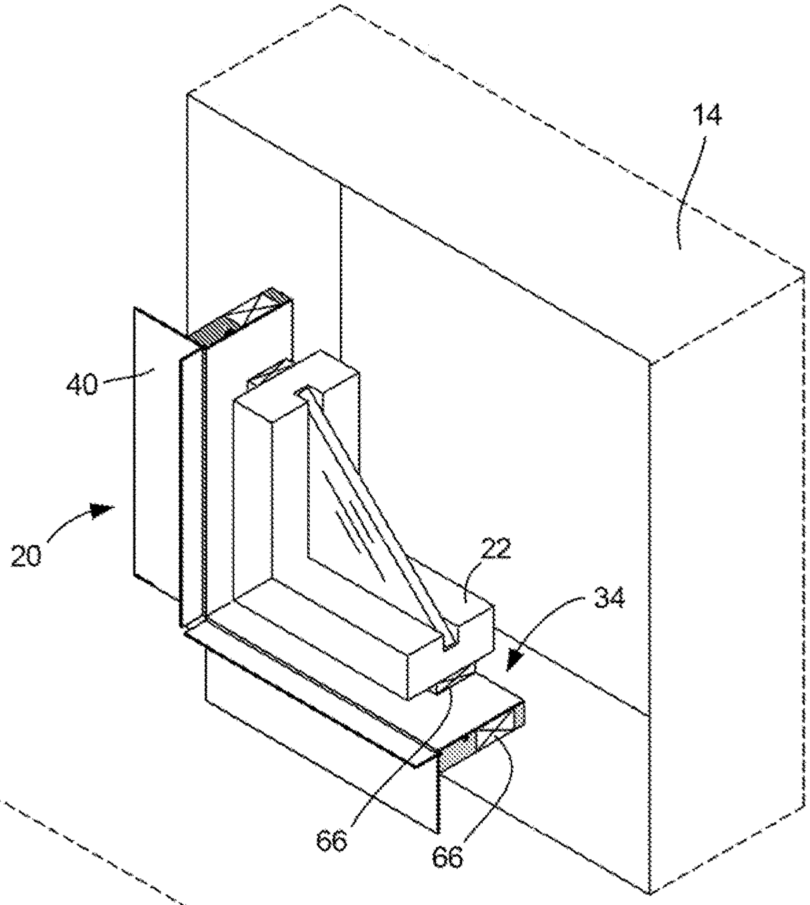
FIGS. 3A and 3B are portions of the frame in FIG. 2A, installed with the opening of a cladding wall.
Figure 3A:
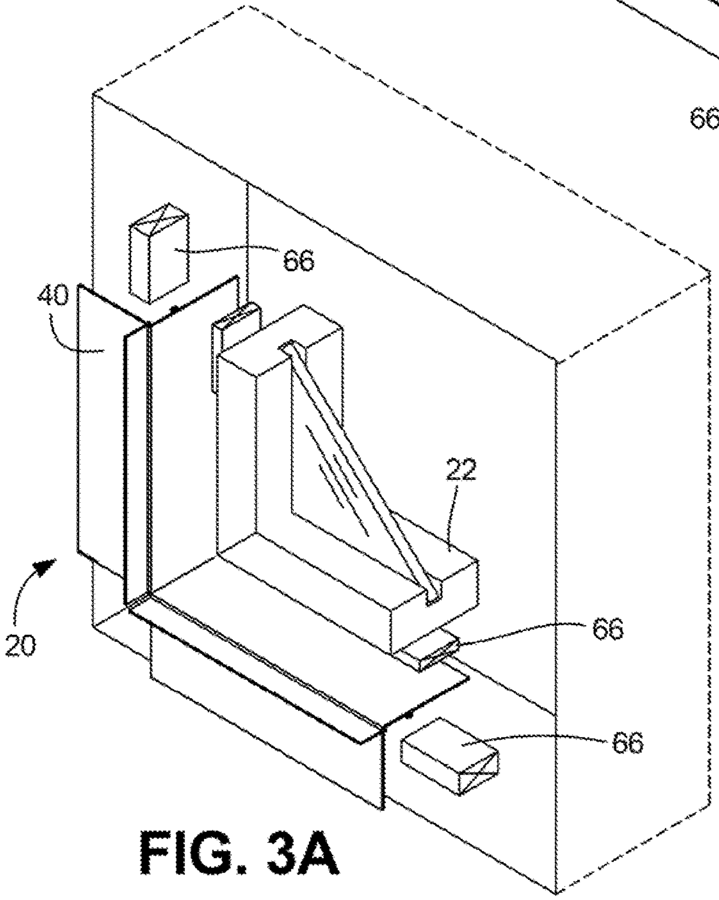

FIGS. 3A and 3B show a frame 20 installed. Notice that the window unit 22 can be positioned anywhere in the inner box space 34 and wooden/plastic/metal blocks/spacers are used to shim the window unit into exact position. The frame 20 can be shimmed into place with blocks 66 to be perfectly aligned with the sight lines of the clad façade, i.e. so that the windows are aligned from the exterior, making the exterior look perfectly aligned, without customizing the cladding fabrication. Wide flanges 40 "fill in the gap" allowing substantial centering flexibility and still maintain a seal between the cladding and the frame. Previously, the cladding had to be made to specific requirements, typically onsite to accommodate variances. Prefabricated construction is far simpler and cheaper but could not account for variances.

Figure 4:
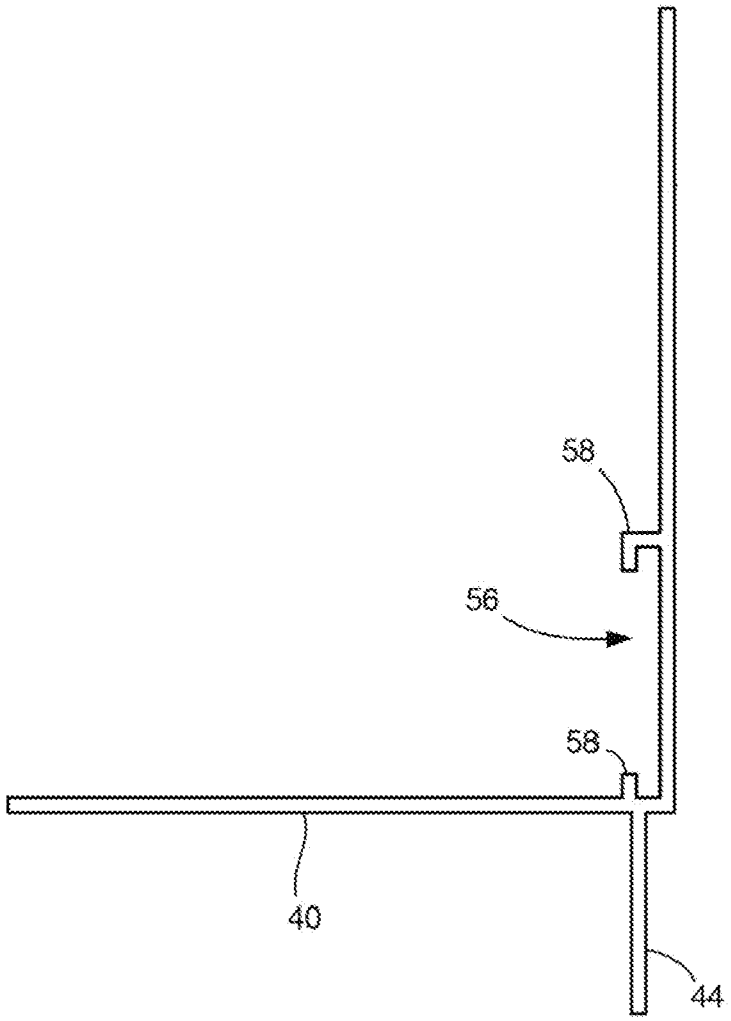
FIG. 4 is a top plan of a portion of the frame in FIG. 2A.

FIG. 4 shows a top view of a frame portion in FIG. 2A.

Figure 5A:
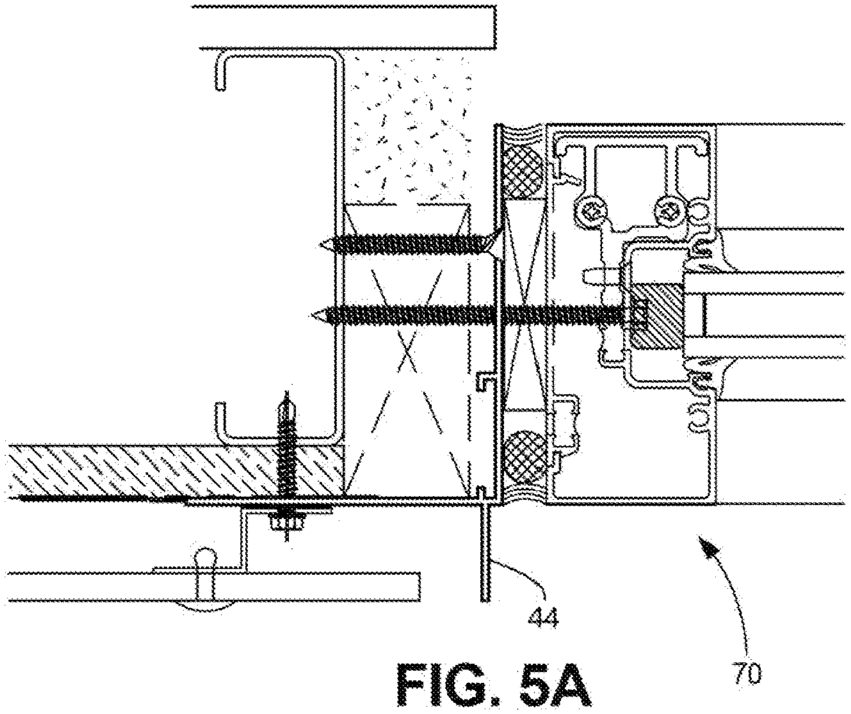
FIGS. 5A and 5B are top sectional views of a portion of the frame installed.
Figure 5B:
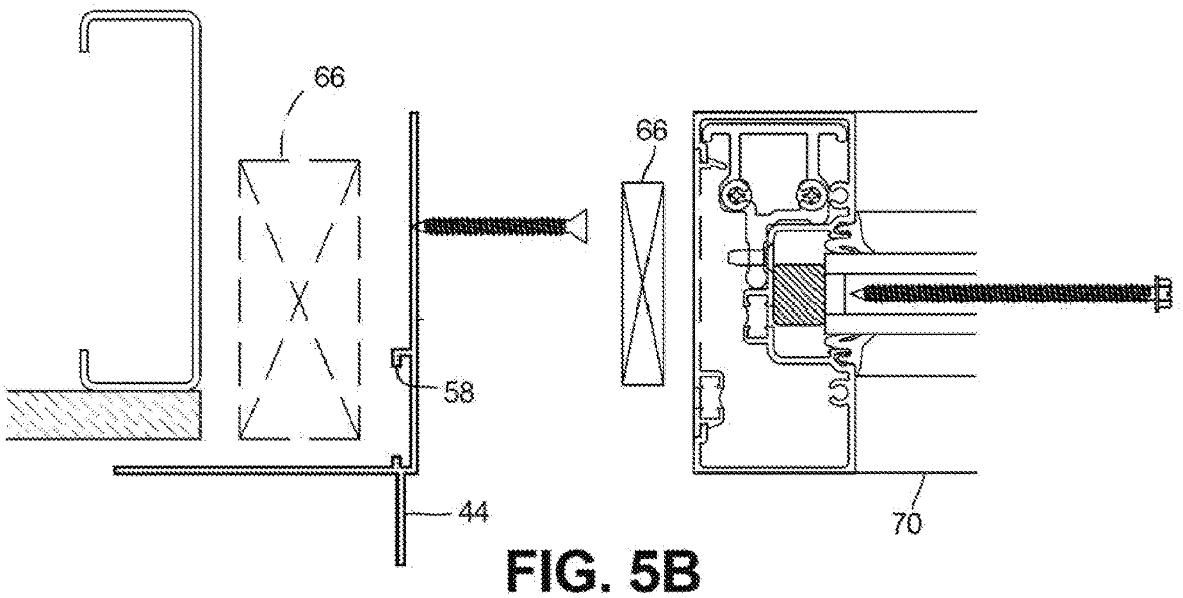

FIGS. 5A and 5B are top section views which include the abutting edge of the clad façade 70 and various screens which are used to attach the frame to the façade.

Figure 6:
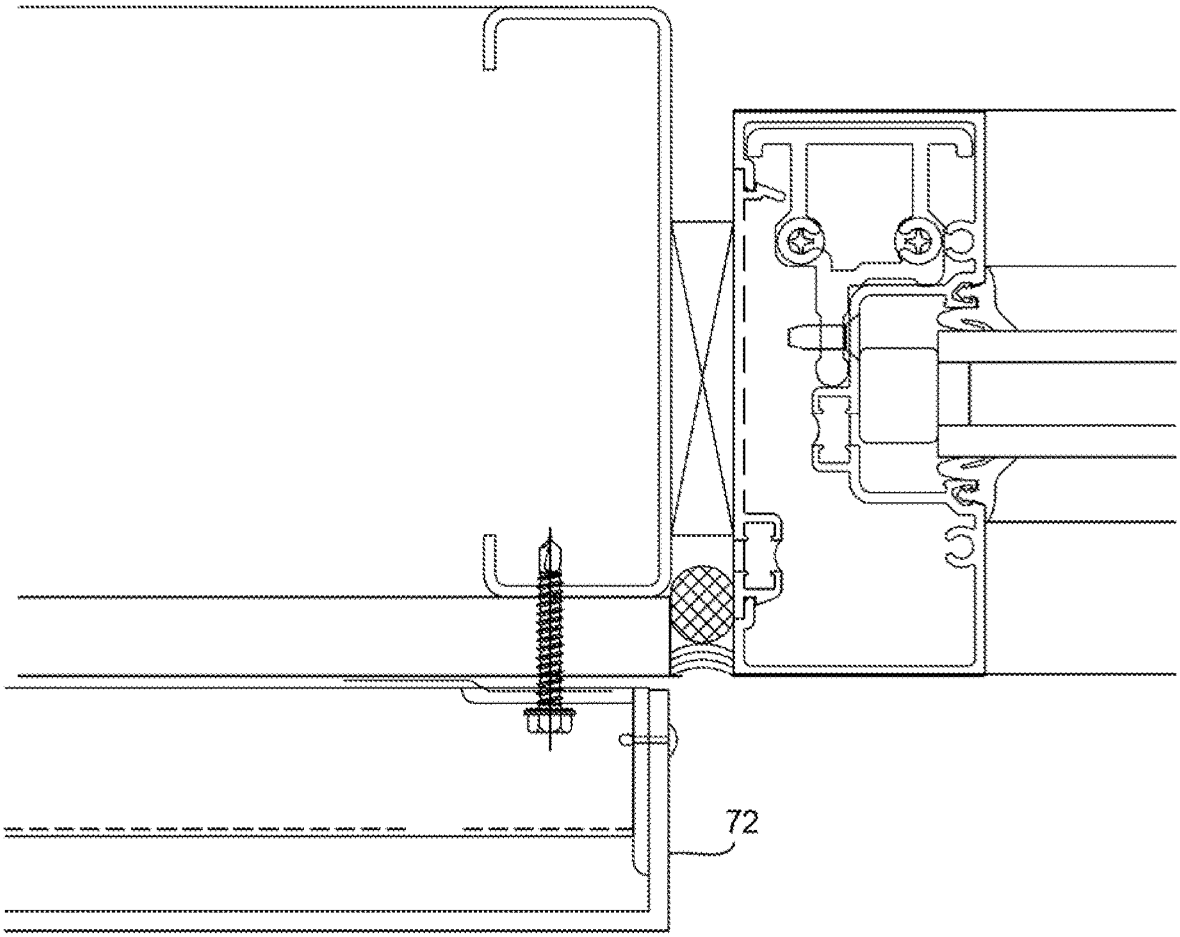
FIG. 6 is a top sectional view of a portion of the frame installed.

FIG. 6 shows a further façade element 72.

Figure 7A:
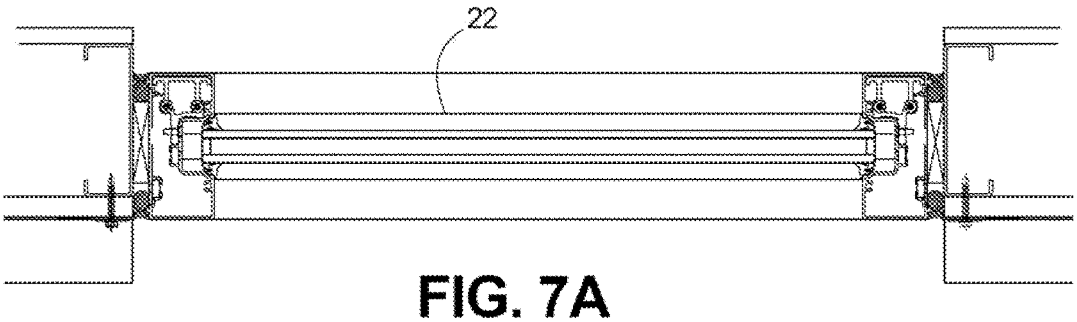
FIGS. 7A, 7B and 7C are top sectional views of a portion of the frame installed.
Figure 7B:
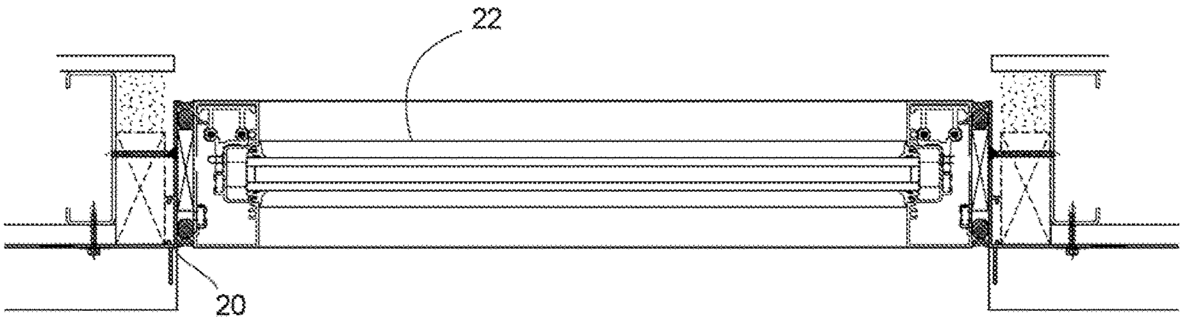
Figure 7C:
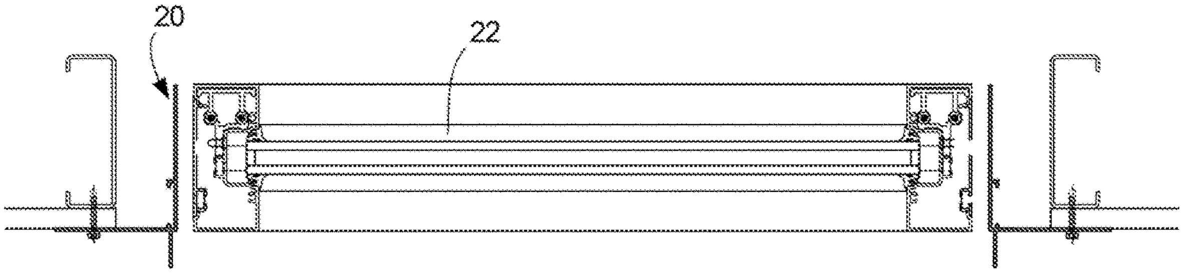

FIGS. 7A, 7B and 7C show a top view of the full window unit 22 installed in various configurations. FIG. 7A is without the adjustable frame. FIG. 7B is with the adjustable frame 20 in place and FIG. 7C is an exploded view of FIG. 7B.

Figure 8A:
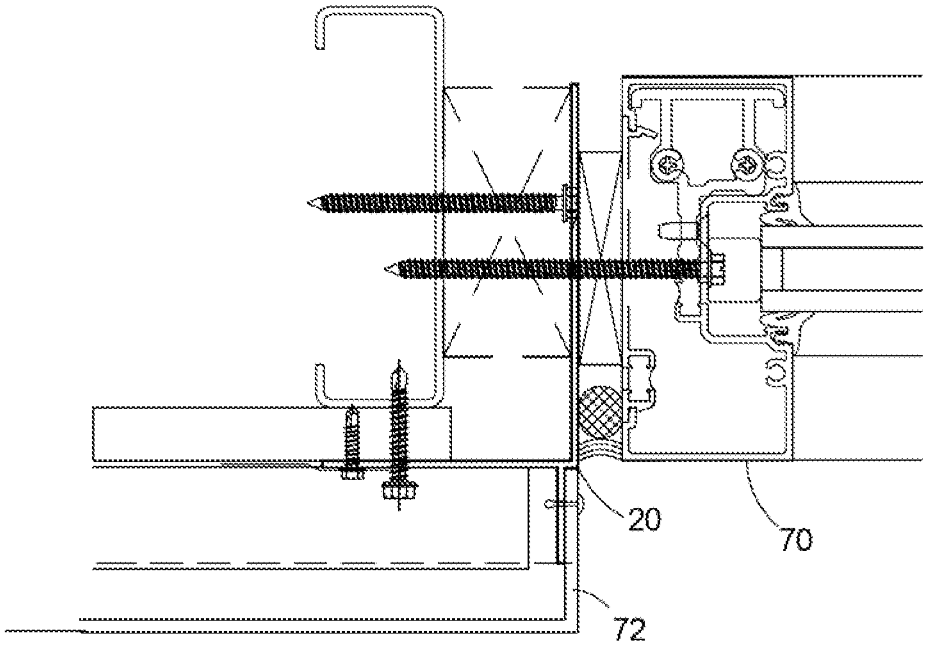
FIGS. 8A, 8B, 8C and 8D are top sectional views of a portion of the frame and window unit installed.
Figure 8B:
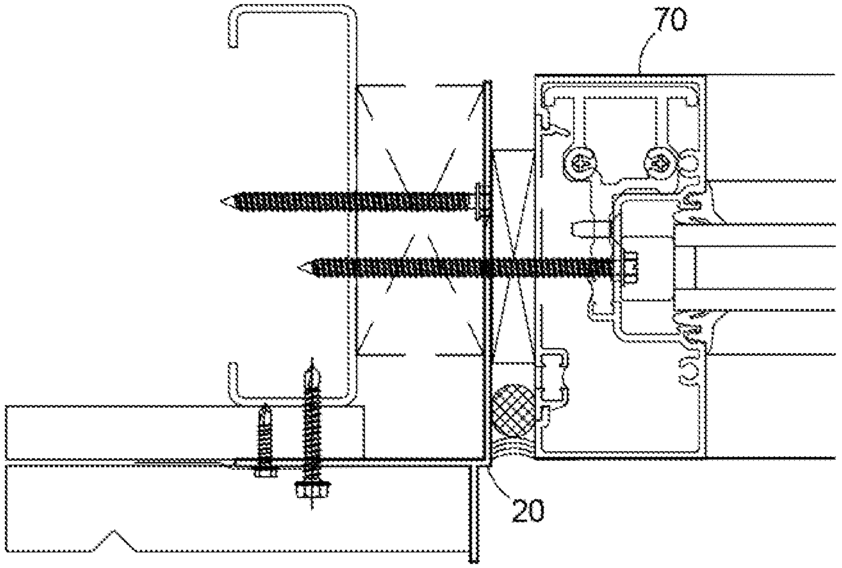
Figure 8C:
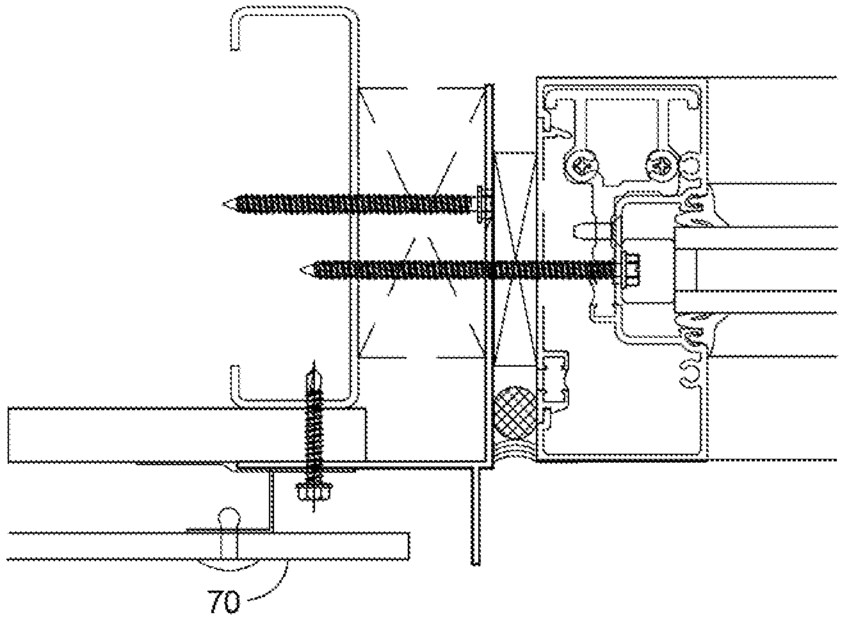
Figure 8D:
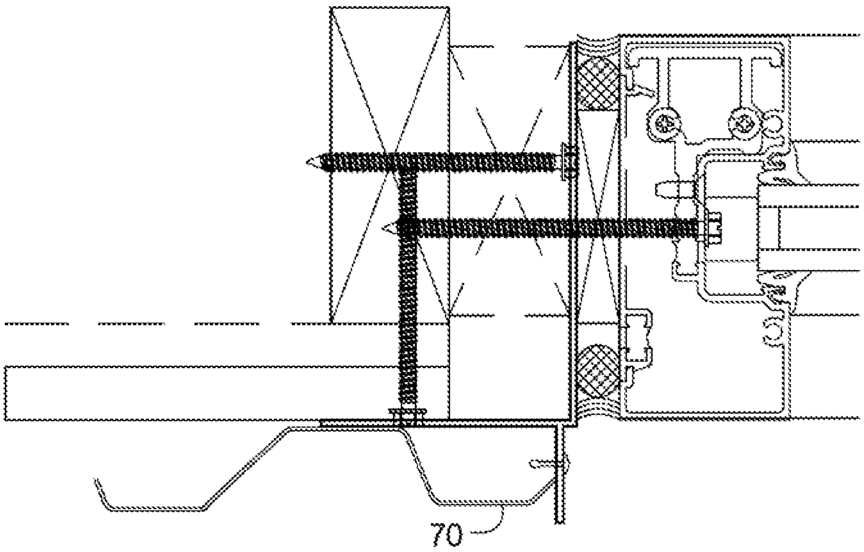

FIG. 8A shows the subject matter of FIG. 5A bit with a façade element 72 in place over the frame 20 to show how the gap between the frame and the façade is fully covered. FIG. 8B is similar to FIG. 5A. FIGS. 8C and 8D show alternative covering materials 70 such as a corrugated metal surface.

The description of the invention and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A method of adjustably framing a building openings on a building having a building wall with building wall openings for doors or windows which are not precisely vertically or horizontally aligned with each other, and a façade wall adjacent to and parallel to the building wall, said building wall and said facade wall comprising separate walls, the façade wall having façade openings for doors or windows which correspond to the building wall openings which are proximate thereto, so that the façade openings may be vertically or horizontally aligned on the building wall openings, the method comprising the steps of:

a. for each façade opening on the façade wall, constructing a façade wall precut opening having an opening equal to or larger than the size of the corresponding building wall opening;

b. constructing a box frame to be inserted and affixed to the façade wall precut opening, said box frame having a plurality of panels having planar surfaces and top, bottom and side edges wherein the side edges are joined to form a box defining an inner box equal to or larger than the building wall opening; the box frame constructed to further include a plurality of horizontal flanges extending orthogonal from the planar surfaces and extending outwardly away from the inner box;

c. loosely installing the box frame into the façade wall precut opening;

d. adjusting the position of the box frame within the façade wall precut opening such that each box frame is vertically and horizontally aligned with adjacent said box frames, thereby creating the appearance of aligned openings in the building;

e. permanently affixing the box frame to the façade wall precut opening; thereby fixing the box frames into alignment with each other.

2. A method of adjustably framing a building opening on a building having a building wall with building wall openings for doors or windows which are not precisely vertically or horizontally aligned with each other, and a façade wall adjacent to and parallel to the building wall, said building wall and said façade wall comprising separate walls, the façade wall having façade openings for doors or windows which correspond to the building wall opening for doors and windows which are proximate to each other, so that the façade openings may be vertically or horizontally aligned on the building wall openings, the method comprising the steps of:

a. for each façade opening on the façade wall, constructing a façade wall precut opening having an opening equal to or larger than the size of the corresponding building wall opening;

b. constructing a box frame to be inserted and affixed to the façade wall precut opening, said box frame constructed to have a plurality of panels having planar surfaces and top, bottom and side edges wherein the side edges are joined to form a box defining an inner box equal to or larger than the building wall opening;

the box frame constructed to include a plurality of right angle joint elements to be received within channels on said planar surfaces, the joint elements being inserted into the channels to maintain the box frame together; the box frame further constructed to further include a plurality of horizontal flanges extending orthogonal from the planar surfaces and extending outwardly away from the inner box;

c. loosely installing the box frame into the façade wall precut opening;

d. adjusting the position of the box frame within the façade wall precut opening such that each box frame is vertically and horizontally aligned with adjacent said box frames, thereby creating the appearance of aligned openings in the building;

e. permanently affixing the box frame to the façade wall precut opening thereby fixing the box frames into alignment with each other.

3. A method of adjustably framing a building opening on a building having a building wall with building wall openings for doors or windows which are not precisely vertically or horizontally aligned with each other, and a façade wall adjacent to and parallel to the building wall, said building wall and said façade wall comprising separate walls, the façade wall having façade openings for doors or windows which correspond to said building wall opening for doors and windows which are proximate to each other, so that the façade openings may be vertically or horizontally aligned on the building wall openings, the method comprising the steps of:

a. for each façade opening on the façade wall, constructing a façade wall precut opening having an opening equal to or larger than the size of the corresponding building wall opening;

b. constructing a box frame to be inserted and affixed to said façade wall precut opening, said box frame constructed to have a plurality of panels having planar surfaces and top, bottom and side edges wherein the side edges are joined to form a box defining an inner box equal to or larger than the building wall opening; the box frame constructed to include a plurality of right angle joint elements, the joint elements to maintain the box frame together; the box frame further constructed to further include a plurality of horizontal flanges extending orthogonal from the planar surfaces and extending outwardly away from the inner box;

c. loosely installing the box frame into said façade wall precut opening;

d. adjusting the position of the box frame within the façade wall precut opening such that each box frame is vertically and horizontally aligned with adjacent said box frames, thereby creating the appearance of aligned openings in the building;

e. permanently and immovably affixing the box frame to the façade wall precut opening thereby fixing the box frames into alignment with each other.

* * * * *